United States Patent
Chopra et al.

(10) Patent No.: US 9,120,939 B2
(45) Date of Patent: Sep. 1, 2015

(54) EMULSIFIED AQUEOUS INK COMPRISING REACTIVE ALKOXYSILANE FOR INDIRECT PRINTING

(71) Applicant: XEROX CORPORATION, Norwalk, CT (US)

(72) Inventors: Naveen Chopra, Oakville (CA); Jennifer L. Belelie, Oakville (CA); Barkev Keoshkerian, Thornhill (CA); Michelle Chrétien, Mississauga (CA)

(73) Assignee: XEROX CORPORATION, Norwalk, CT (US)

( * ) Notice: Subject to any disclaimer, the term of this patent is extended or adjusted under 35 U.S.C. 154(b) by 78 days.

(21) Appl. No.: 14/067,240

(22) Filed: Oct. 30, 2013

(65) Prior Publication Data

US 2015/0116417 A1 Apr. 30, 2015

(51) Int. Cl.
*B41J 2/01* (2006.01)
*C09D 11/023* (2014.01)
*B41J 2/21* (2006.01)
*B41J 2/005* (2006.01)
*C08K 3/04* (2006.01)
*C08K 5/3415* (2006.01)
*C08K 5/42* (2006.01)

(52) U.S. Cl.
CPC ............ *C09D 11/023* (2013.01); *B41J 2/0057* (2013.01); *B41J 2/2107* (2013.01); *C08K 3/04* (2013.01); *C08K 5/3415* (2013.01); *C08K 5/42* (2013.01); *B41J 2/01* (2013.01)

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 11/002; B41J 2/2056; B41J 2/21; B41J 2/0057; B41J 3/60; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00; B41M 7/0072; B41M 5/52; B41M 5/5218
USPC ......... 347/100, 95, 96, 101, 102, 88, 99, 103, 347/105; 106/31.6, 31.13, 31.27; 523/160, 523/161

See application file for complete search history.

(56) References Cited

U.S. PATENT DOCUMENTS

| | | |
|---|---|---|
| 4,840,674 A | 6/1989 | Schwarz |
| 5,281,261 A | 1/1994 | Lin |
| 5,389,958 A | 2/1995 | Bui |

(Continued)

OTHER PUBLICATIONS

Ciriminna, Rosaria, et al., The Sol-Gel Route to Advanced Silica-Based Materials and Recent Applications, Chemical Reviews, Oct. 2, 2012.

(Continued)

*Primary Examiner* — Manish S Shah
(74) *Attorney, Agent, or Firm* — Pillsbury Winthrop Shaw Pittman LLP

(57) ABSTRACT

An emulsified aqueous ink for use in an indirect printing process including: a reactive alkoxysilane; a surfactant; a solvent and co-solvent mixture having water; and a colorant, wherein the ink forms a cross-linked film containing siloxane linkages when the reactive alkoxysilane is hydrolyzed and condensed with heat.

20 Claims, 1 Drawing Sheet

(56) References Cited

U.S. PATENT DOCUMENTS

| | | | |
|---|---|---|---|
| 5,531,818 | A | 7/1996 | Lin |
| 5,693,129 | A | 12/1997 | Lin |
| 6,180,690 | B1* | 1/2001 | Spinelli ............ 523/160 |
| 6,224,660 | B1* | 5/2001 | Stubbe et al. ......... 106/31.6 |
| 6,461,419 | B1 | 10/2002 | Wu |
| 7,270,408 | B2 | 9/2007 | Odell |
| 7,690,782 | B2 | 4/2010 | Odell |
| 8,334,026 | B2 | 12/2012 | Chretien |
| 2010/0173079 | A1* | 7/2010 | Akiyama et al. ........ 347/100 |
| 2010/0249304 | A1* | 9/2010 | Kitamura et al. ....... 524/403 |
| 2011/0050781 | A1* | 3/2011 | Akiyama et al. ........ 347/100 |
| 2012/0058286 | A1* | 3/2012 | De Saint-Romain ....... 428/34.7 |

OTHER PUBLICATIONS

Szczepanowicz, et al. Physicochem. Probl. Miner. Process (2012), 48(2), 403-412.

U.S. Appl. No. 14/067,469, filed Oct. 30, 2013, entitled "Inkjet Ink Containing Polystyrene Copolymer Latex Suitable for Indirect Printing"; First Inventor: Jenny Eliyahu.

U.S. Appl. No. 14/067,074, filed Oct. 30, 2013, entitled "Electron Beam Curable Inks for Indirect Printing"; First Inventor: Michelle N. Chretien.

U.S. Appl. No. 14/067,054, filed Oct. 30, 2013, entitled Photocurable Inks for Indirect Printing; First Inventor: Michelle N. Chretien.

U.S. Appl. No. 14/067,152, filed Oct. 30, 2013, entitled "Curable Aqueous Latex Inks for Indirect Printing"; First Inventor: Jennifer L. Belelie.

U.S. Appl. No. 14/067,191, filed Oct. 30, 2013, entitled "Curable Latex Inks Comprising an Unsaturated Polyester for Indirect Printing"; First Inventor: Jennifer L. Belelie.

U.S. Appl. No. 14/067,290, filed Oct. 30, 2013, entitled "Dual Component Inks Comprising Reactive Latexes for Indirect Printing"; First Inventor: Naveen Chopra.

U.S. Appl. No. 14/067,325, filed Oct. 30, 2013, entitled "Emulsified Curable Inks for Indirect Printing"; First Inventor: Daryl W. Vanbesien.

U.S. Appl. No. 14/067,443, filed Oct. 30, 2013, entitled "Emulsified Electrorheological Inks for Indirect Printing"; First Inventor: Naveen Chopra.

U.S. Appl. No. 14/066,716, filed Oct. 30, 2013, entitled "Ink Jet Ink for Indirect Printing Applications"; First Inventor: Jenny Eliyahu.

* cited by examiner

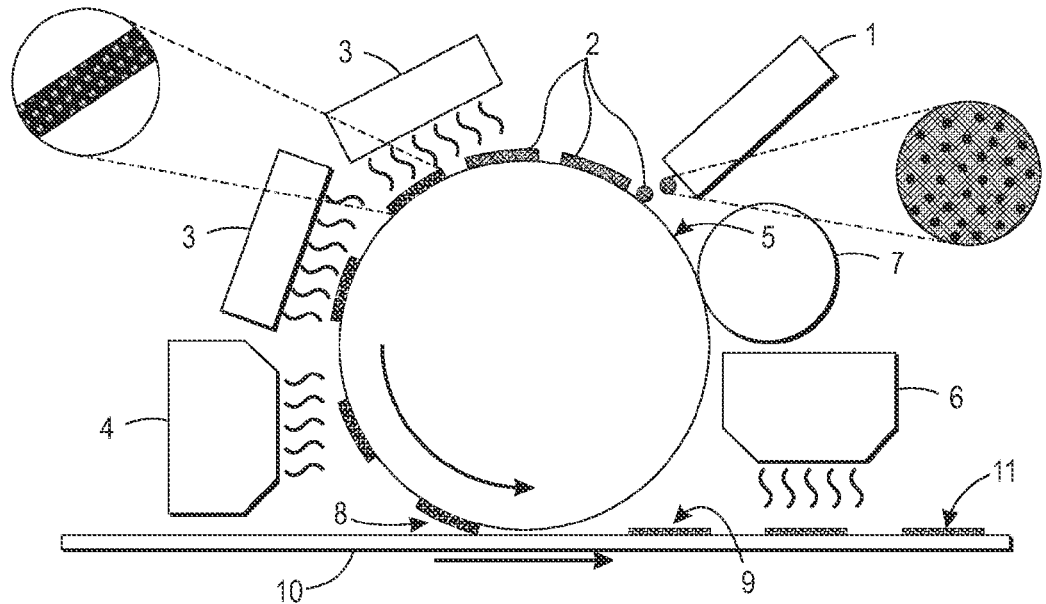

EMULSIFIED AQUEOUS INK COMPRISING REACTIVE ALKOXYSILANE FOR INDIRECT PRINTING

INTRODUCTION

The presently disclosed embodiments are related generally to emulsified aqueous ink compositions comprising a reactive alkoxysilane component for indirect printing method.

Indirect printing process is a two-step printing process wherein the ink is first applied imagewise onto an intermediate receiving member (drum, belt, etc.) using an inkjet printhead. The ink wets and spreads onto the intermediate receiving member to form a transient image. The transient image then undergoes a change in properties (e.g., partial or complete drying, thermal or photo-curing, gelation, etc.) and the resulting transient image is then transferred to the substrate.

Inks suitable for such indirect printing process may be designed and optimized to be compatible with the different subsystems, such as, jetting, transfer, etc., that enable high quality printing at high speed. Typically, inks that display good wettability do not efficiently transfer onto the final substrate, or conversely inks that transfer efficiently to the substrate do not wet the intermediate receiving member. To date, there is no commercially available ink that enables both the wetting and the transfer functions.

Thus, there exists a need to develop an ink suitable for indirect printing process, and particularly, there exists a need to develop an ink that exhibits good wetting of the intermediate receiving member and is capable of efficient transfer to the final substrate.

Each of the foregoing U.S. patents and patent publications are incorporated by reference herein. Further, the appropriate components and process aspects of the each of the foregoing U.S. patents and patent publications may be selected for the present disclosure in embodiments thereof.

SUMMARY

According to embodiments illustrated herein, there is provided novel phase change ink compositions comprising an emulsified aqueous ink for use in an indirect printing process comprising: a reactive alkoxysilane; a surfactant; and an optional colorant.

In particular, the present embodiments provide an emulsified aqueous ink for use in an indirect printing process comprising a reactive alkoxysilane; a surfactant; and a colorant; wherein the ink has a surface tension of from about 15 to about 50 mN/m, and wherein the ink has a viscosity of from about 2 centipoise to about 20 centipoise at 30° C.

In embodiments, there is provided method of printing with an aqueous ink comprising (a) providing an emulsified aqueous ink comprising: a reactive alkoxysilane; a surfactant; and a colorant; (b) applying the ink to an intermediate substrate; (c) hydrolyzing the alkoxysilane to form an ink film comprising a crosslinked matrix comprises siloxane linkages; and (d) transferring the ink film from the intermediate substrate to a final substrate.

BRIEF DESCRIPTION OF THE DRAWINGS

For a better understanding of the present embodiments, reference may be made to the accompanying figures.

FIG. 1 is a diagrammatical illustration of an imaging member in accordance with the present embodiments for applying a two-step transfer and curing process in an indirect printing system.

DETAILED DESCRIPTION

In the following description, it is understood that other embodiments may be utilized and structural and operational changes may be made without departure from the scope of the present embodiments disclosed herein.

In this specification and the claims that follow, singular forms such as "a," "an," and "the" include plural forms unless the content clearly dictates otherwise. All ranges disclosed herein include, unless specifically indicated, all endpoints and intermediate values. In addition, reference may be made to a number of terms that shall be defined as follows:

As used herein, the term "viscosity" refers to a complex viscosity, which is the typical measurement provided by a mechanical rheometer that is capable of subjecting a sample to a steady shear strain or a small amplitude sinusoidal deformation. In this type of instrument, the shear strain is applied by the operator to the motor and the sample deformation (torque) is measured by the transducer. Examples of such instruments are the Rheometrics Fluid Rheometer RFS3 or the ARES mechanical spectrometer, both made by Rheometrics, a division of TA Instruments. Disclosed herein is an aqueous ink including an emulsified sol-gel precursor which is suitable for an indirect print process, or indirect printing ink jet applications. The aqueous ink of the present embodiments may possess the required surface tension (in the range of 15-50 mN/m), viscosity (in the range of 3-20 cps), and particle size (<600 nm) for use in an inkjet (e.g., piezoelectric) printhead.

Average particle size (or particle diameter) disclosed herein can be measured by methods that use light scattering technology to infer particle size. The particle size can be determined using a Malvern Mastersizer (Malvern Instruments Ltd.). The particle diameter refers to the length of the pigment particle as derived from images of the particles generated by Transmission Electron Microscopy.

In embodiments, the emulsified aqueous ink has a surface tension of from about 15 mN/m to about 50 mN/m, for example from about 20 mN/m to about 40 mN/m, or from about 20 mN/m to about 30 mN/m. The surface tension can be measured with a tensiometer instrument, such as the one from Krüss.

In embodiments, the emulsified aqueous ink has a viscosity of from about 2 cps to about 20 cps, for example from about 3 cps, to about 15 cps, or from about 4 cps to about 12 cps, at the temperature of jetting. In particular embodiments, the ink compositions are jetted at temperatures of less than about 100° C., such as from about 25° C. to about 100° C., or from about 30° C. to about 95° C., such as from about 30° C. to about 90° C.

In embodiments, the emulsified aqueous ink has an average emulsion droplet size of less than about 600 nm, for example from about 25 nm to about 500 nm, or from about 50 nm to about 300 nm. The droplet size can be determined by dynamic light scattering.

FIG. 1 discloses a diagrammatical illustration of an imaging system in accordance with the present embodiments for applying a two-step transfer and hydrolysis process whereby an ink of the present disclosure is printed onto an intermediate transfer surface for subsequent transfer to a receiving substrate. During the indirect print process, the ink of the present embodiments 2 is jetted and spread onto an intermediate receiving member 4 via an inkjet 1. The ink 2 contains a hydrolyzable alkyl silane 6. The hydrolyzable alkyl silane 6 may be emulsified in an aqueous phase 7 (e.g., a continuous aqueous phase). The intermediate receiving member 4 may be provided in the form of a drum, as shown in FIG. 1, but may also be provided as a web, platen, belt, band or any other suitable design.

Referring again to FIG. 1, the intermediate receiving member 4 may be heated by a heater device 3 to remove the water content (partially or fully) in the ink vehicle of ink 2, and the alkoxysilane is destabilized and hydrolyzes and reacts to form a cross-linked matrix. The cross-linked matrix may be formed during, and/or after the evaporation of the water content in the ink vehicle of ink 2. The remaining water portion of the ink vehicle, if any, may continue to be removed via heat by the heater device 3 leaving a solid ink film behind. The ink image 8 is then transferred from the intermediate receiving member 4 to the final receiving substrate 10. The transfer of the ink image may be performed through contact under pressure. Image robustness is especially important for packaging applications such as folding carton, for example.

It is important to note that an ink suitable for an indirect printing process must be able to wet the intermediate receiving member 4 to enable formation of the transient image 2, and undergo a stimulus induced property change to form image 8 to enable release from the intermediate receiving member 4 in the transfer step.

Reactive Alkoxysilane

The aqueous ink of the present embodiments includes a non-aqueous phase or a non-aqueous vehicle including a reactive alkoxysilane. As used herein, the term 'reactive alkoxysilane' is synonymous with the term 'alkoxysilane,' which contains at least one reactive silyl ether groups that is reactive towards water. As used herein, the term "silyl ether" refers to a silicon atom bonded to one or more carbon-containing groups via an oxygen atom (i.e., an ether linkage).

The term 'sol-gel' is a generic descriptor for this class of materials, as described in a recent review article by Ciriminna et al. (Chem. Rev. (2013), 113 (8), pp 6592-6620. The alkoxysilane provides reactive silyl groups that can be hydrolyzed in the presence of small amounts of water to form compounds having silanol (SiOH) groups that may be further react to form —Si—O—Si— linkages, thereby forming a crosslinked matrix. The alkoxysilane have a formula of $Si(OR)_4$, wherein R is an alkyl group. The alkoxy portion (i.e., —OR) of the alkoxysilane contains from 1 to about 12 carbon atoms, from 1 to about 8 carbon atoms, or from 1 to about 4 carbon atoms. The alkoxy group can be straight or branched. In embodiments, the hydrolyzable alkoxysilane includes tetramethoxysilane, tetraethoxysilane (TEOS), tetrapropoxysilane, tetraisopropoxy silane, or mixture thereof. The amount of the alkoxysilane present in the ink may be from about 3 to about 20 weight percent, from about 5 to about 15 weight percent, or from about 10 to about 12 weight percent based on the total weight of the ink.

The alkoxysilane may be emulsified in an aqueous phase (e.g., a continuous aqueous phase), usually with the aid of a surfactant. Non-limiting examples of surfactant include silicone (e.g., BYK 347). The concentration of surfactant in the aqueous emulsion of alkoxysilane if from about 0.1 to about 5 weight percent, from about 0.1 to about 3 weight percent, or from about 0.1 to about 2 weight percent by weight of the ink.

The non-aqueous phase (or oil phase) of the emulsion includes a water-insoluble solvent, any desired water-insoluble solvent can be used as long as it is hardly miscible with water and it can dissolve the alkoxysilane. Examples of water-insoluble solvent includes, but are not limited to, halogenated alkanes such as chloroform, methylene chloride, carbon tetrachloride, dicholorethane, tetrachloroethylene and mixtures thereof. Other solvents that may be used for the nonaqueous/oil phase include aliphatic hydrocarbons, such as, hexane, heptane, octane, isooctane, Isopar, or aromatic hydrocarbons, such as benzene, toluene, mesitylene. The amount of water-insoluble solvent may be present in the amount of from about 1 to about 10 weight percent, from about 1 to about 7.5 weight percent, or from about 1 to about 5 weight percent by weight of the ink.

The non-aqueous phase may include an alkoxysilane derivative, such as, aminopropyltriethoxysilane (APS). The amount of alkoxysilane derivative present in the ink may be from about 3 to about 20 weight percent, from about 5 to about 15 weight percent, or from about 10 to about 12 weight percent based on the total weight of the ink.

Typically, the weight ratio of the aqueous phase to the non-aqueous phase (i.e., water to water-insoluble solvent) is from about 99:1 to about 80:20, or from about 95:5 to about 85:15.

During indirect printing, the ink of the present embodiments may be jetted onto an intermediate transfer substrate; subsequently, the water portion of the ink may be removed via heat. The removal of water in the ink disturbs the stability of the alkoxysilane emulsion and causes the reactions of hydrolysis and condensation to occur as the ink droplets coalesce, dispersant is displaced, and the mixture is dried. The alkoxysilanes are hydrolyzed to silanols that further condense to form a cross-linked matrix/cross-linked film containing siloxane linkages (—Si—O—Si—). The cross-linked matrix may contain a silica loading of from about 0.5 weight percent to about 10 weight percent, from about 1 weight percent to about 5 weight percent, or from about 2 weight percent to about 5 weight percent, based on the total weight of the ink. The resulting cross-linked film is typically on the order of from about 0.5 to about 10 μm, from about 0.5 to about 5 μm, or from about 0.5 to about 2 μm.

Scheme 1 below demonstrates one embodiment of the present disclosure, where an alkoxysilane, such as tetraethoxysilane, is hydrolyzed to form silicic acid as the intermediate and then subsequently condensed to form a cross-linked matrix containing siloxane linkages.

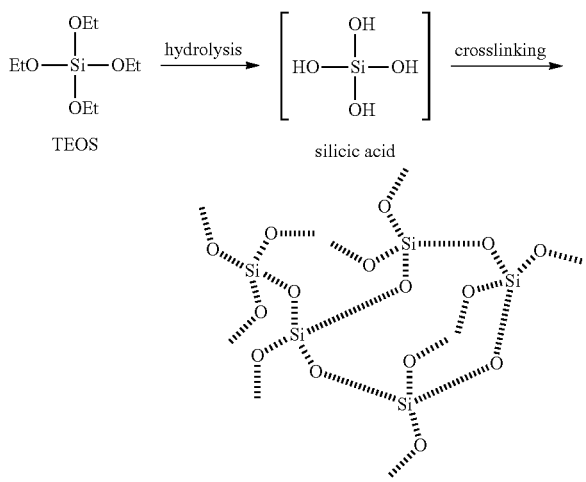

Co-Solvents

The ink compositions may comprise water, or a mixture of water and a water soluble or water miscible organic component, referred to as a co-solvent, humectant, or the like (hereinafter co-solvent) such as alcohols and alcohol derivatives, including aliphatic alcohols, aromatic alcohols, dials, glycol ethers, polyglycol ethers, long chain alcohols, primary aliphatic alcohols, secondary aliphatic alcohols, 1,2-alcohols, 1,3-alcohols, 1,5-alcohols, ethylene glycol alkyl ethers, propylene glycol alkyl ethers, methoxylated glycerol, ethoxylated glycerol, higher homologues of polyethylene glycol alkyl ethers, and the like, with specific examples including ethylene glycol, propylene glycol, diethylene glycols, glycerine, dipropylene glycols, polyethylene glycols, polypropylene glycols, trimethylolpropane, 1,5-pentanediol, 2-methyl-1,3,-propanediol, 2-ethyl-2-hydroxymethyl-1,3-propanediol, 3-methoxybutanol, 3-methyl-1,5-pentanediol, 1,3-propanediol, 1,4-butanediol, 2,4-heptanediol, and the like; also suitable are amides, ethers, urea, substituted ureas such as thiourea, ethylene urea, alkylurea, alkylthiourea, dialkylurea, and dialkylthiourea, carboxylic acids and their salts, such as 2-methylpentanoic acid, 2-ethyl-3-propylacrylic acid, 2-ethyl-hexanoic acid, 3-ethoxyproponic, acid, and the like, esters, organosulfides, organosulfoxides, sulfones (such as sulfolane), carbitol, butyl carbitol, cellusolve, ethers, tripropylene glycol monomethyl ether, ether derivatives, hydroxyethers, amino alcohols, ketones, N-methylpyrrolidinone, 2-pyrrolidinone, cyclohexylpyrrolidone, amides, sulfoxides, lactones, polyelectrolytes, methyl sulfonylethanol, imidazole, 1,3-dimethyl-2-imidazolidinone, betaine, sugars, such as 1-deoxy-D-galactitol, mannitol, inositol, and the like, substituted and unsubstituted formamides, substituted and unsubstituted acetamides, and other water soluble or water miscible materials, as well as mixtures thereof. In embodiments, the co-solvent is selected from the group consisting of ethylene glycol, N-methylpyrrolidone, methoxylated glycerol, ethoxylated glycerol, and mixtures thereof. When mixtures of water and water soluble or miscible organic liquids are selected as the liquid vehicle, the water to organic ratio ranges can be any suitable or desired ration, in embodiments from about 100:0 to about 30:70, or from about 97:3 to about 40:60, or from about 95:5 to about 60:40. The non-water component of the liquid vehicle generally serves as a humectant or co-solvent which has a boiling point higher than that of water (100° C.). The organic component of the ink vehicle can also serve to modify ink surface tension, modify ink viscosity, dissolve or disperse the colorant, and/or affect the drying characteristics of the ink.

In certain embodiments, the co-solvent is selected from the group consisting of sulfolane, methyl ethyl ketone, isopropanol, 2-pyrrolidinone, polyethylene glycol, and mixtures thereof.

Colorants

The ink composition herein may also contain a colorant. Any suitable or desired colorant can be used in embodiments herein, including pigments, dyes, dye dispersions, pigments dispersions, and mixtures and combinations thereof.

The colorant may be provided in the form of a colorant dispersion. In embodiments, the colorant dispersion has an average particle size of from about 20 to about 500 nanometers (nm), or from about 20 to about 400 nm, or from about 30 to about 300 nm. In embodiments, the colorant is selected from the group consisting of dyes, pigments, and combinations thereof, and optionally, the colorant is a dispersion comprising a colorant, an optional surfactant, and an optional dispersant.

As noted, any suitable or desired colorant can be selected in embodiments herein. The colorant can be a dye, a pigment, or a mixture thereof. Examples of suitable dyes include anionic dyes, cationic dyes, nonionic dyes, zwitterionic dyes, and the like. Specific examples of suitable dyes include Food dyes such as Food Black No. 1, Food Black No. 2, Food Red No. 40, Food Blue No. 1, Food Yellow No. 7, and the like, FD & C dyes, Acid Black dyes (No. 1, 7, 9, 24, 26, 48, 52, 58, 60, 61, 63, 92, 107, 109, 118, 119, 131, 140, 155, 156, 172, 194, and the like), Acid Red dyes (No. 1, 8, 32, 35, 37, 52, 57, 92, 115, 119, 154, 249, 254, 256, and the like), Acid Blue dyes (No. 1, 7, 9, 25, 40, 45, 62, 78, 80, 92, 102, 104, 113, 117, 127, 158, 175, 183, 193, 209, and the like), Acid Yellow dyes (No. 3, 7, 17, 19, 23, 25, 29, 38, 42, 49, 59, 61, 72, 73, 114, 128, 151, and the like), Direct Black dyes (No. 4, 14, 17, 22, 27, 38, 51, 112, 117, 154, 168, and the like), Direct Blue dyes (No. 1, 6, 8, 14, 15, 25, 71, 76, 78, 80, 86, 90, 106, 108, 123, 163, 165, 199, 226, and the like), Direct Red dyes (No. 1, 2, 16, 23, 24, 28, 39, 62, 72, 236, and the like), Direct Yellow dyes (No. 4, 11, 12, 27, 28, 33, 34, 39, 50, 58, 86, 100, 106, 107, 118, 127, 132, 142, 157, and the like), Reactive Dyes, such as Reactive Red Dyes (No. 4, 31, 56, 180, and the like), Reactive Black dyes (No. 31 and the like), Reactive Yellow dyes (No. 37 and the like); anthraquinone dyes, monoazo dyes, disazo dyes, phthalocyanine derivatives, including various phthalocyanine sulfonate salts, aza(18)annulenes, formazan copper complexes, triphenodioxazines, and the like; and the like, as well as mixtures thereof.

Examples of suitable pigments include black pigments, white pigments, cyan pigments, magenta pigments, yellow pigments, or the like. Further, pigments can be organic or inorganic particles. Suitable inorganic pigments include carbon black. However, other inorganic pigments may be suitable such as titanium oxide, cobalt blue (CoO—Al2O3), chrome yellow (PbCrO4), and iron oxide. Suitable organic pigments include, for example, azo pigments including diazo pigments and monoazo pigments, polycyclic pigments (e.g., phthalocyanine pigments such as phthalocyanine blues and phthalocyanine greens), perylene pigments, perinone pigments, anthraquinone pigments, quinacridone pigments, dioxazine pigments, thioindigo pigments, isoindolinone pigments, pyranthrone pigments, and quinophthalone pigments), insoluble dye chelates (e.g., basic dye type chelates and acidic dye type chelate), nitro pigments, nitroso pigments, anthanthrone pigments such as PR168, and the like. Representative examples of phthalocyanine blues and greens include copper phthalocyanine blue, copper phthalocyanine green, and derivatives thereof (Pigment Blue 15, Pigment Green 7, and Pigment Green 36). Representative examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19, and Pigment Violet 42. Representative examples of anthraquinones include Pigment Red 43, Pigment Red 194, Pigment Red 177, Pigment Red 216 and Pigment Red 226. Representative examples of perylenes include Pigment Red 123, Pigment Red 149, Pigment Red 179, Pigment Red 190, Pigment Red 189 and Pigment Red 224. Representative examples of thioindigoids include Pigment Red 86, Pigment Red 87, Pigment Red 88, Pigment Red 181, Pigment Red 198, Pigment Violet 36, and Pigment Violet 38. Representative examples of heterocyclic yellows include Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, Pigment Yellow 90, Pigment Yellow 110, Pigment Yellow 117, Pigment Yellow 120, Pigment Yellow 128, Pigment Yellow 138, Pigment Yellow 150, Pigment Yellow 151, Pigment Yellow 155, and Pigment Yellow 213. Such pigments are commercially available in either powder or press cake form from a number of sources including, BASF Corporation, Engelhard Corporation, and Sun Chemical Corporation. Examples of black pigments that may be used include carbon pigments. The carbon pigment can be almost any commercially available carbon pigment that provides acceptable optical density and print characteristics. Carbon pigments suitable for use in the present system and method include, without limitation, carbon black, graphite, vitreous carbon, charcoal, and combinations thereof. Such carbon pigments can be manufactured by a variety of known methods, such as a channel method, a contact method, a furnace method, an acetylene method, or a thermal method, and are commercially available from such vendors as Cabot Corporation, Columbian Chemicals Company, Evonik, and E.I. DuPont de Nemours and Company. Suitable carbon black pigments include, without limitation, Cabot pigments such as MONARCH 1400, MONARCH 1300, MONARCH 1100, MONARCH 1000, MONARCH 900, MONARCH 880, MONARCH 800, MONARCH 700, CAB-O-JET 200, CAB-O-JET 300, REGAL, BLACK PEARLS, ELFTEX, MOGUL, and VULCAN pigments; Columbian pigments such as RAVEN 5000, and RAVEN 3500; Evonik pigments such as Color Black FW 200, FW 2, FW 2V, FW 1, FW18, FW S160, FW S170, Special Black 6, Special Black 5, Special Black 4A, Special Black 4, PRINTEX U, PRINTEX 140U, PRINTEX V, and PRINTEX 140V. The above list of pigments includes unmodified pigment particulates, small molecule attached pigment particulates, and polymer-dispersed pigment particulates. Other pigments can also be selected, as well as mixtures thereof. The pigment particle size is desired to be as small as possible to enable a stable colloidal suspension of the particles in the liquid vehicle and to prevent clogging of the ink channels when the ink is used in a thermal ink jet printer or a piezoelectric ink jet printer.

In embodiments, the emulsified aqueous ink has an average pigment particle size of less than about 600 nm, for example from about 25 nm to about 500 nm, or from about 50 nm to about 300 nm.

The colorant can be present in the ink composition in any desired or effective amount, in embodiments, the colorant can be present in an amount of from about 0.05 to about 15 percent, or from about 0.1 to about 10 percent, or from about 1 to about 5 percent by weight, based on the total weight of the ink composition.

Ink Composition Preparation and Use

The inks of embodiments may be prepared by any suitable technique and process, such as by simple mixing of the ingredients. One process entails mixing all of the ink ingredients together and filtering the mixture to obtain an ink. Inks can be prepared by mixing the ingredients, heating if desired, and filtering, followed by adding any desired additional additives to the mixture and mixing at room temperature with moderate shaking until a homogeneous mixture is obtained, in one embodiment from about 5 to about 10 minutes. Alternatively, the optional ink additives can be mixed with the other ink ingredients during the ink preparation process, which takes place according to any desired procedure, such as by mixing all the ingredients, heating if desired, and filtering. Further examples of ink preparation methods are set forth in the Examples below.

The ink compositions described herein may be jetted at temperatures of less than about 100° C., such as from about 25° C. to about 100° C., or from about 30° C. to about 90° C. The ink compositions are thus ideally suited for use in piezoelectric ink jet devices.

The ink compositions can be employed in indirect (offset) printing ink-jet applications, wherein when droplets of the ink are ejected in an imagewise pattern onto a recording substrate, the recording substrate is an intermediate-transfer member and the ink in the imagewise pattern is subsequently transferred from the intermediate-transfer member to a final recording substrate.

When an indirect-printing process is used, the intermediate-transfer member can be of any desired or suitable configuration, such as a drum or roller, a belt or web, a blanket, a flat surface or platen, or the like. The temperature of the intermediate-transfer member can be controlled by any desired or suitable method, such as by situating heaters in or near the intermediate-transfer member, using air flow to dry the transfer member, or the like.

It will be appreciated that varies of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

While the description above refers to particular embodiments, it will be understood that many modifications may be made without departing from the spirit thereof. The accompanying claims are intended to cover such modifications as would fall within the true scope and spirit of embodiments herein.

The presently disclosed embodiments are, therefore, to be considered in all respects as illustrative and not restrictive, the scope of embodiments being indicated by the appended claims rather than the foregoing description. All changes that come within the meaning of and range of equivalency of the claims are intended to be embraced therein.

EXAMPLES

The examples set forth herein below and are illustrative of different compositions and conditions that can be used in practicing the present embodiments. All proportions are by weight unless otherwise indicated. It will be apparent, however, that the present embodiments can be practiced with many types of compositions and can have many different uses in accordance with the disclosure above and as pointed out hereinafter.

Example 1

Primary Suspension of TEOS in Non-Aqueous Vehicle

Emulsions of TEOS derivatives, such as APS (aminopropyltriethoxysilane) and DTSACl (dimethyloctadecyl [3-(trimethoxysilyl)propyl]ammonium chloride) are prepared by mixing the precursors with water, chloroform (as the oil phase), Tween 80 surfactant, and NaOH solution according to Szczepanowicz et al. Physicochem. Probl. Miner. Process (2012), 48(2), 403-412.

Example 2

Preparation of Final Ink Formulation A

To a 100 mL amber glass bottle is added sulfalone, 2-pyrrolidinone, PEO, surfactant and carbon black dispersion. While the mixture is stirred with a magnetic stir bar at 200 RPM, water (~20% to wash TEOS suspension beaker) is slowly added. The TEOS suspension is then slowly added to the bottle which is chased with 20% water to clean residuals. The ink is then homogenized for 5 minutes at 2000 RPM.

Based on experimental data disclosed in co-pending U.S. patent application Ser. No. 14/066,716, entitled "INK JET INK FOR INDIRECT PRINTING APPLICATIONS," and U.S. patent application Ser. No. 14/067,entitled "INKJET INK CONTAINING POLYSTYRENE COPOLYMER LATEX SUITABLE FOR INDIRECT PRINTING," prophetic ink formulation A is predicted to demonstrate suitable viscosity (5-20 cps) and surface tension (20-22 mN/m) for jetting.

Formulation A is applied via inkjet onto an intermediate receiving member (e.g., a drum) having a surface energy of less than the liquid ink surface tension. When jetted onto the substrate, the water begins to evaporate, the TEOS emulsion is destabilized and reacts to form a cross-linked film. The remaining water portion of the vehicle is removed via heat leaving a solid ink film behind. The cross-linked film is transferred to the final substrate, resulting in an extremely robust image. Image robustness will be especially important for packaging applications such as folding carton, for example.

Table 1 below shows the components of Ink Formulation A. To determine the amount of each material required, the total mass of ink is chosen. For Ink Formulation A, 50 g of total ink is required. Next, the Wt % solids of each component is chosen. For Ink Formulation A, 10 wt % of TEOS is required in the ink. Next, the wt % required solids of each component is divided by it's Wt % concentration to determine the Wt % material or dispersion required. This is (i) divided by (ii) to give (iii). For TEOS, this is 10 wt % divided by 20 wt % to give 50 wt %. In other words, 50 wt % of a 20 wt % TEOS solution will yield 10 wt %. Finally the weight % material or dispersion required is multiplied by the total ink mass (50 g) to give the mass of each component dispersion. For TEOS, this is 50 wt %×50 g=25 g. Thus, 25 g of a 20 wt % TEOS solution will give 10 wt % TEOS ink a 50 g sized ink sample. For components that exist as 100% neat forms, such as BYK347, the division of (i) by (ii) is unnecessary, columns (i) and (iii) become identical, and the calculation is simplified to % solids required multiplied by the total mass of ink, which is 0.16%×50 g ink=0.08 g BYK 347.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

All the patents and applications referred to herein are hereby specifically, and totally incorporated herein by reference in their entirety in the instant specification.

What is claimed is:

1. An emulsified aqueous ink for use in an indirect printing process comprising:
   a reactive alkoxysilane;
   a surfactant;
   a solvent and co-solvent mixture comprising water; and
   an optional colorant, wherein the ink forms a cross-linked film containing siloxane linkages when the reactive alkoxysilane is hydrolyzed and condensed with heat.

2. The ink of claim 1, wherein the reactive alkoxysilane is present in an amount of from about 3 to about 20 weight percent based on the total weight of the ink.

3. The ink of claim 1, wherein the alkoxy portion of the reactive alkoxysilane contains from 1 to 12 carbon atoms.

4. The ink of claim 1, wherein the reactive alkoxysilane is selected from the group consisting of tetramethoxysilane, tetraethoxysilane, tetrapropoxysilane, tetraisopropoxysilane and mixture thereof.

5. The ink of claim 4, wherein the reactive alkoxysilane comprises tetraethoxysilane.

6. The ink of claim 1, wherein the colorant is selected from the group consisting of pigment, dye, mixtures of pigment and dye, mixtures of pigments, and mixtures of dyes.

7. The ink of claim 1, wherein the ink comprises a non-aqueous vehicle present in an amount of from about 1 weight percent to about 10 weight percent based on the total weight of the ink.

TABLE 1

| Ink A Component | Function | (i) Wt % solids in ink | (ii) Wt % concentration in material, dispersion or water | (iii) Wt % material or dispersion required | (iv) mass/g |
| --- | --- | --- | --- | --- | --- |
| APS (20 wt %) emulsion in chloroform (5 wt %)/ Tween 80 (surfactant, 5 wt %)/water (70 wt %) | TEOS source | 10 | 20 | 50 | 25 |
| Sulfalone (5% water) | Humectant | 15.84 | 95 | 16.67 | 8.34 |
| 2-pyrrolidinone | Humectant | 3.33 | 100 | 3.33 | 1.67 |
| Polyethylene oxide (PEO) (Mw 20k) | Viscosity modifier | 0.72 | 100 | 0.72 | 0.36 |
| Carbon black 300 | Pigment dispersion | 3.3 | 14.87 | 22.19 | 11.1 |
| BYK 347 | Silicone surfactant for aqueous systems | 0.16 | 100 | 0.16 | 0.08 |
| Water | | | | Balance | Balance |
| TOTAL | | | | 100 | 50 |

8. The ink of claim 7, wherein the non-aqueous vehicle comprises an alkoxysilane derivative.

9. The ink of claim 8, wherein the alkoxysilane derivative comprises aminopropyltriethoxysilane.

10. The ink of claim 7, wherein the non-aqueous vehicle further comprises a water-insoluble solvent.

11. The ink of claim 1, wherein the surfactant comprises sulfones.

12. The ink of claim 1, wherein the surfactant is present in an amount of from about 0.1 to about 5 weight percent based on the total weight of the ink.

13. The ink of claim 1, wherein the ink has a surface tension of from about 15 to about 50 mN/m.

14. The ink of claim 1, wherein the ink has a viscosity of from about 2 centipoise to about 20 centipoise at 30° C.

15. An emulsified aqueous ink for use in an indirect printing process comprising:
  a reactive alkoxysilane;
  a surfactant;
  a solvent and co-solvent mixture comprising water; and
  a colorant;
wherein the ink has a surface tension of from about 15 to about 50 mN/m, and wherein the ink has a viscosity of from about 2 centipoise to about 20 centipoise at 30° C. and further wherein the ink forms a cross-linked film containing siloxane linkages and having a silica loading of from about 0.5 weight percent to about 10 weight percent when the reactive alkoxysilane is hydrolyzed and condensed with heat.

16. The ink of claim 15, wherein the reactive alkoxysilane is present in an amount of from about 3 to about 20 weight percent based on the total weight of the ink.

17. A method of printing with an aqueous ink comprising:
  a) providing an emulsified aqueous ink comprising:
    a reactive alkoxysilane;
    a surfactant;
    a solvent and co-solvent mixture comprising water; and
    a colorant;
  b) applying the ink to an intermediate substrate;
  c) hydrolyzing the alkoxysilane to form an ink film comprising a crosslinked matrix comprises siloxane linkages; and
  d) transferring the ink film from the intermediate substrate to a final substrate.

18. The method of claim 17, wherein the ink film has a silica loading of from about 0.5 weight percent to about 10 weight percent based on the total weight of the ink.

19. The method of claim 17, wherein the ink has a surface tension of from about 15 to about 50 mN/m.

20. The method of claim 17, wherein the ink has a viscosity of from about 2 centipoise to about 20 centipoise at 30° C.

* * * * *